June 11, 1963  S. A. FREESE  3,093,293
CONTAINER OPENING PROVISION
Filed Jan. 2, 1962  2 Sheets-Sheet 1

*INVENTOR.*
SAMUEL A. FREESE
BY
Gravely, Leeder & Woodruff
ATTORNEYS

June 11, 1963  S. A. FREESE  3,093,293
CONTAINER OPENING PROVISION
Filed Jan. 2, 1962  2 Sheets-Sheet 2

INVENTOR.
SAMUEL A. FREESE
BY
Gravely, Lieder & Woodruff
ATTORNEYS

United States Patent Office 3,093,293
Patented June 11, 1963

3,093,293
CONTAINER OPENING PROVISION
Samuel A. Freese, Warson Woods, Mo., assignor to Container Corporation of America, Sefton Fibre Can Company Division, St. Louis, Mo., a corporation of Delaware
Filed Jan. 2, 1962, Ser. No. 163,757
5 Claims. (Cl. 229—51)

This invention relates to opening provisions for containers and the like, and is particularly concerned with the structure of such opening provision and the method of its manufacture.

A preferred opening provision for containers will be disclosed in connection with fibre body containers constructed with a so-called easy opening tear means which assists in breaking at least one container wall ply so that the final opening operation is reduced to breaking an inner wall which is provided with a joint defining the line of final opening which extends about the circumference of the container body and substantially from end to end. Fibre body container requires a certain degree of strength to retain the contents and hold up under normally rough handling. This is particularly true of containers when filled with a product capable of generating pressure outwardly on the walls of the body, such products including biscuit dough which is under refrigeration.

Therefore, it is an important object of this invention to provide a container having easy opening means for breaking the body wall, but which is strong and rugged to withstand internal pressure, rough handling and the effects of moisture from refrigeration storage.

It is also an important object of this invention to provide a container with means for quickly and easily opening the same and one which may be operated by manual manipulation without the assistance of opener devices of any kind.

A further object of this invention is to provide a novel method of manufacturing a container with easy opening provisions on a continuous basis and with relatively simple apparatus which will result in accurate timing of the various operations to produce good results on an economical basis.

Other objects of this invention will be disclosed or will appear from the following description which relates to a preferred example of a container and apparatus adapted for its continuous manufacture.

In this connection, the container comprises a foil liner adhesively secured to an inner ply of fibre or paper material which, in turn, is adhesively secured to an outer ply of fibre or paper material. The outer ply is covered by a label ply of foil or other suitable material, and easy opening means is disposed between the inner and outer plies in predetermined relation to a joint formed in the inner wall ply. The container formed in this manner is provided with a pull tab which includes the easy opening means and the outer ply and label, and the tab is formed by suitably slitting these plies after the plies have been combined into a layer for winding on the mandrel of a suitable winding machine. The slitting of the tab involves a unique operation which produces a tab opening for improved access to the tab itself, such operation being performed in conjunction with the slitting operation and in advance of an operation for inserting reinforcing means under the layer in which the tab is formed.

The invention further consists in the structural features and steps in the method of manufacturing a container which will be hereinafter described in detail, and with reference to the accompanying drawings, wherein.

Figure 1:
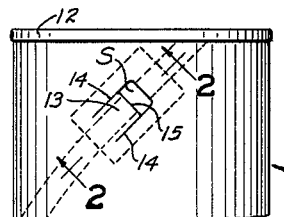
FIG. 1 is a fragmentary elevational view of a container provided with the improved opening means.
Figure 2:
FIG. 2 is a greatly enlarged sectional view of a fragmentary portion of the container seen at line 2—2 in FIG. 1.

With reference to FIGS. 1 and 2, the container is seen to include a body 10 closed at one end by a suitable member 11 crimped on the body wall. The opposite end is also closed, usually after the contents has been inserted, by a similar member 12 which is also crimped on the body wall. The body 10 is composed of an inner layer A of multiple plies, an outer layer B also of multiple plies and a tear means T disposed between layers A and B extending spirally about the body 10 between the end closure members 11 and 12 for substantially one turn or 360°. In forming the container body 10 on a spiral winder apparatus depicted generally schematically by the mandrel M in FIG. 3, a pull tab 13 is formed by making parallel slits or cuts 14 in layer B and cross cutting the layer at 15 between the slits 14. The cut 15 exposes a starting end of a strip of the layer B by which the layer may be torn down spirally of the body 10 to effect the opening of the container. In order to gain greater access to the starting end 15 of the tab 13, a portion of the layer B is turned or folded back upon itself at 16 thereby forming an easily seen gap or space S in the layer B. The space S is slightly wider than the tear means T, as shown in FIG. 1, thereby forming a recess for easy access to the end 15 which may be lifted up along the parallel slits 14. The raised tab 13 initially bends or folds approximately at the point 17 (FIG. 2) and is of suitable length to permit a secure grasp thereof for subsequent pulling to tear the layer B in the direction of the means T.

The starting end tab 13 formed as described above would expose a portion of the body inner wall A, except for the presence of a strengthening patch or ply 18 which is secured between the layers A and B to maintain wall strength in the area of the slits 14 and 15 and space S. From the foregoing description it can be appreciated that the container body 10 is provided with a unique tear tab structure which does not materially weaken the wall strength and results in a much more easily openable container than heretofore found on the market.

The advantages are quite evident and the structure thus provided is an improvement on the character of easy-open container disclosed and claimed in the prior application of Donald V. Hanlon, filed November 9, 1959, and bearing Serial No. 851,799, now Patent No. 3,051,370, issued August 28, 1962. The method of manufacturing the present container is also an improvement over the container disclosed and claimed in the prior application of David J. O'Sullivan, filed November 9, 1959, and bearing Serial No. 851,887. A more complete understanding of certain methods of manufacturing the container of FIG. 1 herein may be had by reference to said prior applications, but it will be sufficient for present purposes to refer to FIGS. 3 and 4 of this application for details of structure and method.

Figure 3:
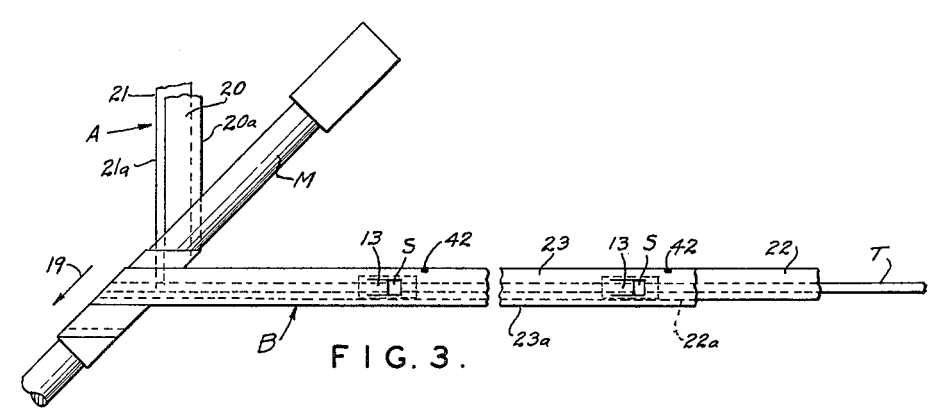
FIG. 3 is a schematic plan view of the winding apparatus by which the container may be manufactured in a continuous process.

In FIG. 3 the winding apparatus schematically illustrated by the mandrel M is fed with the layers A and B, and the usual belt device (not shown) of such apparatus furnishes the required movement of layers A and B to and about the mandrel. The resulting stick of containers advances along the mandrel in the direction of arrow 19 to a suitable cut-off device not necessary to show. The layer A consists of a suitable paper backed foil liner ply 20 and a ply 21 of kraft paper of approximately .015 thickness. The ply 21 is fed onto the mandrel M such that its edge 21a is butted with the adjacent margin of the leading turn, while the liner ply 20 is lapped at margin 20a to provide a inner seal for the container. As the layer A advances during the winding operation, layer B is wound thereover in an off-set relation so that the butt joint of layer A is covered by layer B and more particularly the butt joint at 21a is registered with the tear strip means T.

Layer B in FIG. 3 is composed of a wall ply 22 of suitable material, such as kraft paper of .010 thickness, and a suitable label ply 23. As the respective wall ply 22, tear means T and label ply 23 are fed to the mandrel M, the means T is disposed beneath the ply 22 and the label ply 23 is disposed on top of ply 22 with a margin 23a extending therefrom to provide an overlap on the exterior of the container body 10 for sealing the body against moisture attack. The wall ply 22 is arranged to form a butt joint at the margin 22a, such butt joint being off-set from the butt joint in the inner wall ply 21. During the advance of layer B and after the plies 22 and 23 and tear means T have been brought together in the desired superposed relation, a tab slitting operation is performed at station C and a patch applying operation is performed at station P. At station C the slitting operation forms the parallel cuts 14 and the cross-cut 15 in a U-shaped pattern. The slitting at 14 is along side the means T and through the plies 22 and 23, whereas the crosscut 15 is through the plies 22 and 23 and through the means T. At the same time and during the slitting operation the fold 16 is formed so that the space S is established. As the layer B advances to station P suitable means is provided for forming a patch 18 from a strip of patch material 18a (FIG. 4) and for applying the patch under the area containing the cuts 14 and 15 and the space S. The prepared layer B then moves to the mandrel M and is superimposed on layer A.

Figure 4:
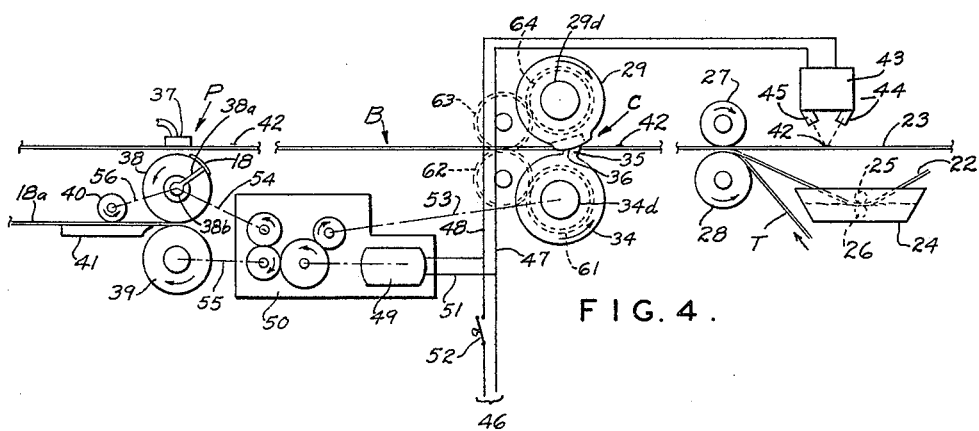
FIG. 4 is a further schematic view in elevation of another portion of the apparatus.

Further understanding of the herein preferred method of manufacturing container body 10 may be had upon reference to FIG. 4. As there is shown in a schematic manner, it can be seen that the wall ply 22 passes through an adhesive bath or applying means 24 which applies adhesive to both faces of the ply through the action of rollers 25 and 26. The ply 22 then moves to the combining rolls 27 and 28 where the means T is joined at the under face of ply 22 and adheres thereto. It is a feature that means T acts to kill the adhesive in the narrow strip established by the means T so that when the layer B reaches the layer A on the mandrel there will be no adherence between plies 21 and 22 where the means T is positioned. This permits the means T to readily lift from the ply 21 when the container is opened.

The label ply 23 also moves the combining rolls 27 and 28 and is adhered to the upper face of ply 22, a sufficient amount of adhesive spreading onto the extending edge 23a to provide for securing such edge 23a in sealed and lapped relation. The thus combined layer B moves from rollers 27 and 28 to station C where the slitting or cutting is performed in a predetermined manner. Station C is provided with a rotary slitting back-up roll 29 having a projecting portion 30 formed with a relief slot 31 which defines a cross-cut edge 32 and parallel side edges 33 more particularly shown in FIGS. 5 to 8. The back-up roll 29 cooperates with a cutting roll 34 on which a cutter element 35 is carried. The element 35 has a concavely formed cutting face 36 which cooperates with the edges 32 and 33 of the recess 31 in roll 29 to form the cut lines 14 and 15.

Further advance of the layer B toward mandrel M brings the cut area into station P where reinforcing patches 18 are applied. In this station the layer B is backed up by a suction lift device 37 which draws the patch 18 upwardly, since the layer B has been slit at 14 and 15 by this time. A patch applying roll 38 brings each patch 18 up to the moving layer where it is picked off the roll by the suction effect of device 37 at the top surface of the layer B. The roll 38 operates in conjunction with a second roll 39 to cut patches 18 from the strip 18a which is fed by the powered roll 40 adjacent a stationary table 41.

FIG. 4 includes a schematic illustration of one form of control for the operations to be performed at stations C and P, such control being regulated and timed by the presence of indicia or spots 42 carried on the label ply 23. The spots 42 are sensed by a suitable electric eye device 43 having the usual projector 44 and receiver 45 which are activated by the spots 42 as they reach the control zone of the device 43. Electrical power from a suitable source 46 is connected by lead 47 to the device 43 and lead 48 connects the device 43 with motor means 49 which drives a suitable geared drive 50. The other side or lead 51 is connected to a switch device 52 for energizing the apparatus. Power from the drive 50 is supplied by a shaft 53 to the roll 34 which also drives roll 29, and other shafts 54 and 55 are connected to the rolls 38 and 39 respectively. A drive take-off shaft 56 connects rolls 38 and 40. While the foregoing disclosure is schematically presented, it is obvious that any suitable drive system may be employed for the purposes expressed herein.

The device 43 is periodically activated by each indicia or spot 42 and likewise the devices in stations C and P are periodically activated to complete the described functions in such timed relation that a tab 13 is formed at station C and a patch is cut and applied at station P. The periodic operation is quite accurate as the printing of the label ply with the spots 42 can be accurately established for spacing of the spots 42 with one to each complete container as predetermined by the length of each container. While not shown, it is obvious that a cut-off device may be disposed at the discharge end of mandrel M and accurately controlled by the device 43 to cut the continuously formed stick into the individual container bodies.

Figure 5:
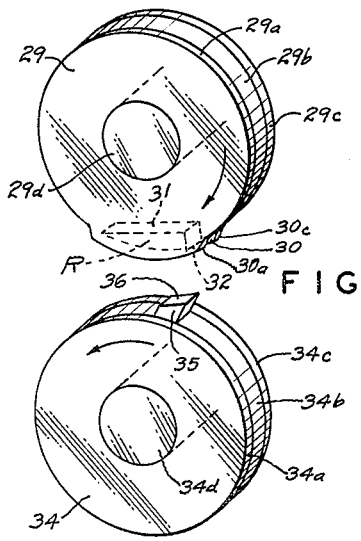
FIG. 5 is an exploded perspective view of means for cutting and forming the tab opening means.

A feature of this invention resides in the forming of the tab 13 and space S such that the container body 10 may be more easily opened without structurally weakening the wall strength. FIGS. 5 to 8 inclusive, will provide an adequate understanding of the same and reference will now be had to such views. FIG. 5 is a perspective view of the tab cutting or slitting means with the members 29 and 34 slightly exploded to show the details more clearly. Thus, member 29 is composed of a sandwich of parts 29a, 29b and 29c suitably secured together and mounted on a shaft 29d. The parts 29a and 29c are each provided with a projection 30a and 30c which projects to form side cutters along the peripheral edges. The central part 29b serves to hold the parts 29a and 29c in properly spaced relation, and also is formed with a partial projection 30 which corresponds to the contour projection 30a or 30c, but is cut away at 31 to form a recess shown in broken outline in FIG. 5 at R. The wall 31 of the recess R terminates in a cutting edge 32 which is directed transversely of the side cutting edges formed between projections 30a and 30c. The member 29 is suitably secured on a shaft 29d and is rotated in accordance with the disclosure of FIG. 4. The cooperating rotating member 34 is made up of a sandwich of parts 34a, 34b and 34c suitably secured together and mounted on a shaft 34d. The parts 34a and 34c are clamping members which secure the central part 34d in position such that the projecting cutter element 35 extends beyond the circular periphery of the parts and is located opposite the recess R in the member 29. The cutter element 35 is provided with a slightly concaved cutting face 36, in which the concavity conforms substantially to the curvature of the side cutting edges of projections 30a and 30c. The cutter element 35 thereby is dimensioned to pass into the recess R beginning adjacent the transverse cutting edge 32 of such recess. As is seen in FIGS. 4 and 5, the drive shaft 53 rotates member 34 through connection with the shaft 34d, and shaft 34d is connected to shaft 29d through a gear train including the gears 60, 61, 62, 63, although it is at once apparent that any other drive arrangement may be utilized in order to rotate members 34 and 29 at the same speeds so that the cutter elements 35 will be properly timed to pass into respective recesses R and effect the desired cut in the layer B which is fed therethrough. It is, of course, appreciated that the cutter element 35 and the side cutter projections 30a and 30c cooperate to form the parallel cuts 14 and transverse cuts 15 as shown in FIG. 1 or 3.

Figure 7:
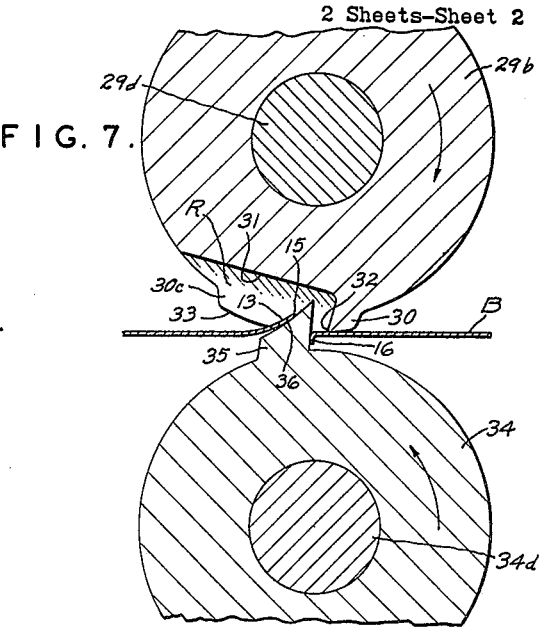
FIG. 7 is a view similar to FIG. 6, but showing a further stage in the tab slitting and folding operation.
Figure 6:
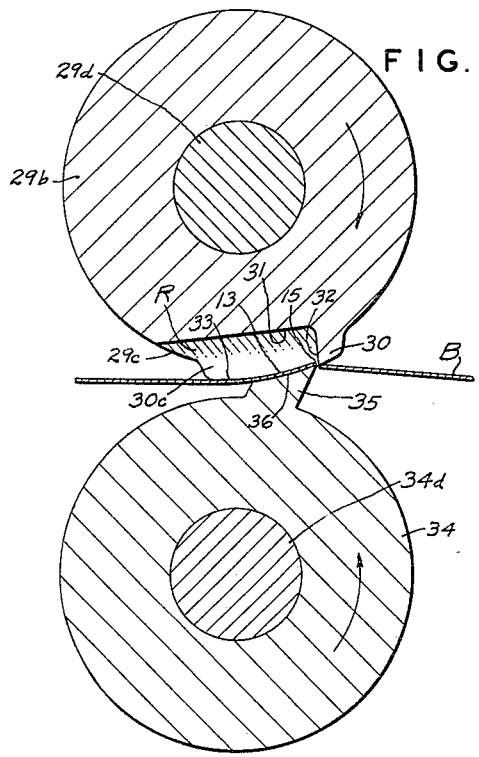
FIG. 6 is a sectional elevational view of the tab forming means herein preferred, the view being taken at the beginning of the tab slitting operation.
Figure 8:
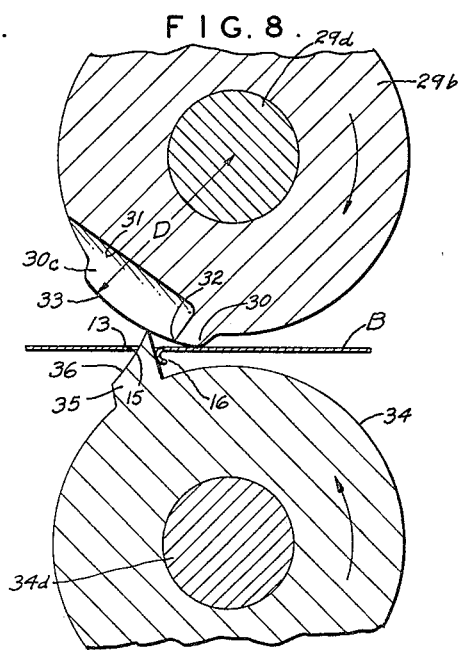
FIG. 8 is still another view similar to FIG. 6 showing the folding operation in a final stage.

Turning now to FIGS. 6, 7, and 8 it can be seen that FIG. 6 illustrates the cutting action of members 29 and 34 at an initial stage, and FIG. 7 illustrates a more advanced stage of the cutting operation in which the parallel cuts 14 and the transverse cuts 15 has been completely formed so that the cutter element 35 extends into the recess R of member 29. At the stage of the operation shown in FIG. 7, the layer B in the zone of the transverse cut 15 is beginning to form the fold 16 at the trailing margin of the cutter element 35. Now referring to FIG. 8 it can be seen that the members 29 and 34 have passed to a point where the cutter element 35 has left the recess R, but is still in engagement with the layer B so that the fold 16 has been moved nearer to its final folded position, thereby forming the gap space S shown in FIG. 2.

In order to have the members 29 and 34 operate in the manner just described, and without causing excessive damage, tearing, or stressing of the fibre or paper material in the layer B, it has been found that the linear speed of the layer B needs to be slightly faster than the linear speed of the members 29 and 34 as measured at the peripheral surface of the cutting projections 30a and 30c. As an example of a successful operation, applicant has obtained good results by moving the layer B at a speed of 125 feet per minute, and rotating the members 29 and 34 at a speed of 100 feet per minute where the dimension D is three inches. At these speeds, the layer B will be caused to slip on the face surface of projection 30 relative to the cutter element 35, thereby causing the portion of the layer following the trailing edge of the element 35 to fold back upon itself at 16. The rotation of the members 29 and 34 is sufficiently fast so that the pull on the layer B from the mandrel M is not resisted by the slower speed of the cutter element 35 long enough to create excessive stress or tearing action therein. On the other hand, the trailing surface of the cutter element 35 remains in contact with the fold 16 long enough to cause it to fold substantially completely back upon itself to the position illustrated in FIG. 2.

It should now be appreciated that the members 29 and 34 perform the functions of cutting the layer B along the parallel lines 14 and along the transverse lines 15, and cutter element 35 simultaneously forms the fold 16 to provide the gap space S. This operation is performed prior to the layer B moving to station P where the reinforcing patch 18 is cut from a continuous supply strip 18a between co-acting members 38 and 39 with the member 38 being provided with suitable means to retain each cut patch 18 on its periphery during transfer of the patch 18 upwardly under the adhesively coated surface of the layer B at the back-up rolls 37. The adhesive contact established with the patch 18 at roll 37 easily withdraws the patch from the member 38. The rolls 38 and 39 are provided with suitable cutting means (not necessary to show) for chopping the strip 18a during rotation. The patch 18 thus formed is held on the roll 38 by vacuum drawn in passage 38a through the axial passage 38b in the roller shaft 54. The passage 38b is connected to a suitable vacuum pump (not necessary to show) and controls which break the vacuum at about the time the patch 18 has touched the adhesive coating under layer B are provided to regulate the operation as indicated.

The layer B with the now applied patch 18 under the cut lines 14 and 15 and covering the gap space S at the fold 16 (FIG. 2) is wound on the mandrel M upon the layer A. The registration of layers A and B is arranged such that the butt joint in layer A at the margin 21a is substantially under the tear means T when layer B is wound over layer A. It should also be appreciated that the usual winder belt means, such as disclosed in the O'Sullivan application Serial No. 851,887, will compress the layers A and B and crease the fold 16 so that it will lie substantially flat in the surface of the container body.

The slitting station C and patch applying station P are spaced apart a distance equal to the length of layer B required to make one complete container body 10, although the spacing could be any multiple of such body length. It has been pointed out that the operations taking place at stations C and P are controlled by the scanning device 43 in response to the spots or indicia 42 carried by the label 23. Thus the means in each station C and P operates intermittently while the layer B moves continuously therethrough.

While the foregoing description has been given in connection with a container body construction comprising essentially two layers in its wall, with each layer made up of several plies, it is understood that the layers may be of any suitable composition without regard for the number of plies. For example, it is possible to have a label strip of sufficient strength and composition to eliminate the separate strip 22 (FIG. 3) and run the tear means T directly under the label. It is contemplated that the layers A and B may have different thicknesses and strengths so that the inner layer will be strong when combined with a lightweight label, but relatively vulnerable to inward pressure when the butt joint of the inner layer is exposed. Other variations and combinations of structure will be brought to mind after understanding the foregoing details of this invention, and it is the aim herein to cover all such variations and combinations in the appended claims.

What is claimed is:

1. A container for packaging material comprising an inner wall layer spirally wound, an outer wall layer spirally wound upon said inner layer, said layers being adhesively united, tear means disposed between said layers and extending spirally about the container with said spirally wound outer wall layer, and means on the container for opening the same by tearing said outer wall layer away to expose said inner wall layer, said opening means including a tab formed in the outer wall layer including a length of said tear means and a fold in said outer wall layer spaced from the tab, said fold being formed by underlapping a portion of the outer wall layer opposite said tab to form a gap space in said outer wall layer to expose the end of said tap.

2. A container for packaging material comprising an inner wall layer spirally wound with its margins forming a butt joint, an outer wall layer spirally wound upon said inner layer and overlying said butt joint, tear means between said layers and extending spirally about the container adjacent said inner wall butt joint, and means on the container for opening the same by tearing said outer wall layer away to expose said inner wall butt joint for rupturing, said opening means including a tab formed in the outer wall layer and including a length of said tear means and a fold in said outer wall layer spaced from the tab, said fold being formed by underlapping a portion of the outer wall layer opposite said tab to provide a gap space in said outer wall layer to expose said tab.

3. A container comprising: a body composed of inner and outer wall layers spirally wound together with said outer layer overlying a butt joint formed in said inner layer, said layers being adhesively secured together; tear means disposed between said layers adjacent the butt joint in said inner layer and extending from a starting end spirally with said butt joint; and means to facilitate the opening of the container body from the starting end of said tear means including a tab at said starting end and a spaced fold, said fold being formed by underlapping a portion of the outer wall layer opposite said tab to form a gap space therebetween to expose said starting end at said tab adjacent the butt joint in said inner wall layer.

4. A container comprising: a body composed of inner and outer wall layers spirally wound together with said outer layer overlying a butt joint formed in said inner layer, said layers being adhesively secured together; tear means disposed between said layers adjacent the butt joint in said inner layer and extending from a starting end spirally with said butt joint; means to facilitate the opening of the container body from the starting end of said tear means including a tab at said starting end and a spaced fold, said fold being formed by underlapping a portion of the outer wall layer opposite said tab to form a gap space therebetween to expose said starting end at said tab adjacent the butt joint in said inner wall layer; and reinforcing means disposed between said inner and outer wall layers in the area of said gap space and tab to cover said butt joint, said reinforcing means being secured to at least one of said layers.

5. A container comprising: a body composed of an inner wound structure having a rupturable seam therein; a covering layer wound about said inner structure; tear means disposed under said covering layer and registering with said rupturable seam in said inner wound structure; and means to facilitate the opening of said body including a tab and a fold providing a gap space in said covering layer, said fold including an underlapped portion of said covering layer spaced from said tab to form said gap space, and said tab includes a portion of said tear means.

References Cited in the file of this patent
UNITED STATES PATENTS

| | | |
|---|---|---|
| 2,120,629 | Schunemann | June 14, 1938 |
| 2,233,423 | Magill | Mar. 4, 1941 |
| 2,679,349 | Mullinix | May 25, 1954 |
| 2,737,091 | Robinson | Mar. 6, 1956 |
| 2,775,395 | Bergstrom | Dec. 25, 1956 |
| 2,795,366 | Magill | June 11, 1957 |
| 2,895,865 | Humphner | July 21, 1959 |
| 2,904,240 | Southwell et al. | Sept. 15, 1959 |
| 3,035,753 | Erekson | May 22, 1962 |
| 3,042,286 | Pottle | July 3, 1962 |
| 3,051,370 | Hanlon | Aug. 28, 1962 |